US012639772B2

(12) United States Patent
Ting

(10) Patent No.: US 12,639,772 B2
(45) Date of Patent: May 26, 2026

(54) ENERGY EFFICIENCY DATA COLLECTION SERVICE

(71) Applicant: Itron, Inc., Liberty Lake, WA (US)

(72) Inventor: Michael Ting, Oakland, CA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 18/112,426

(22) Filed: Feb. 21, 2023

(65) Prior Publication Data

US 2023/0206355 A1      Jun. 29, 2023

Related U.S. Application Data

(63) Continuation of application No. 16/457,059, filed on Jun. 28, 2019, now Pat. No. 11,599,956.

(Continued)

(51) Int. Cl.
*G06Q 50/06*          (2024.01)
*G05B 19/042*         (2006.01)
(Continued)

(52) U.S. Cl.
CPC .......... *G06Q 50/06* (2013.01); *G05B 19/042* (2013.01); *G06F 16/13* (2019.01); *G06F 16/587* (2019.01); *G06Q 10/06315* (2013.01); *H04W 4/029* (2018.02); *H04W 4/20* (2013.01); *G05B 2219/2639* (2013.01)

(58) Field of Classification Search
CPC ............. G06Q 50/06; G06Q 10/06315; G05B 19/042; G05B 2219/2639; G06F 16/13;

G06F 16/587; G06F 16/9035; G06F 16/909; H04W 4/029; H04W 4/20; H04W 4/02; Y02D 30/70; Y02D 10/00
See application file for complete search history.

(56) References Cited

U.S. PATENT DOCUMENTS 8,170,886 B2 *   5/2012   Luff ........................ G06Q 50/06
                                                          705/1.1
8,805,000 B2 *   8/2014   Derby .................... G06Q 50/06
                                                          382/209

(Continued)

FOREIGN PATENT DOCUMENTS

WO       WO-2019105131 A1 *   6/2019   ......... G06K 9/00744

OTHER PUBLICATIONS

Office Action for U.S. Appl. No. 16/457,059, mailed Jun. 9, 2022, Ting, "Energy Efficiency Data Collection Service ", 36 pages.

*Primary Examiner* — Mohammad Ali
*Assistant Examiner* — Dhruvkumar Patel
(74) *Attorney, Agent, or Firm* — Lee & Hayes, P.C.

(57) ABSTRACT

An energy efficiency data collection system architecture may be configured to enable efficient and accurate collection of energy efficiency data associated with users and/or sites associated with users and generation of profiles associated with the users based on the energy efficiency data. An energy efficiency data collection service may receive location information, image data, and user-input data from an application operating on a mobile device associated with a user. The energy efficiency data collection service may generate profiles based on the information received from the application and may provide incentives to the users in response to participating in an energy efficiency data collection survey.

19 Claims, 5 Drawing Sheets

Related U.S. Application Data

(60) Provisional application No. 62/826,031, filed on Mar. 29, 2019.

(51) Int. Cl.

| | | |
|---|---|---|
| *G06F 16/13* | (2019.01) | |
| *G06F 16/587* | (2019.01) | |
| *G06Q 10/0631* | (2023.01) | |
| *H04W 4/029* | (2018.01) | |
| *H04W 4/20* | (2018.01) | |

(56) References Cited

U.S. PATENT DOCUMENTS

| | | | | |
|---|---|---|---|---|
| 9,275,354 | B2 * | 3/2016 | Saito ...................... | G06Q 50/06 |
| 2010/0283606 | A1 * | 11/2010 | Tsypin ................... | G06Q 30/02 |
| | | | | 702/179 |
| 2011/0022242 | A1 * | 1/2011 | Bukhin ................. | G06F 1/3206 |
| | | | | 700/291 |
| 2012/0216123 | A1 * | 8/2012 | Shklovskii ......... | G06Q 30/0201 |
| | | | | 715/738 |
| 2013/0262040 | A1 * | 10/2013 | Buckley ................. | G06Q 50/06 |
| | | | | 703/1 |
| 2014/0019319 | A1 * | 1/2014 | Derby ................... | G06F 3/0488 |
| | | | | 705/30 |
| 2015/0261644 | A1 * | 9/2015 | Zhang ................... | G06F 11/324 |
| | | | | 715/771 |
| 2016/0266594 | A1 * | 9/2016 | Kauffman .............. | G06Q 50/06 |
| 2016/0292321 | A1 * | 10/2016 | Wall ....................... | G06Q 50/06 |
| 2020/0311834 | A1 | 10/2020 | Ting | |

\* cited by examiner

200

COMPUTING DEVICE 106

COMPUTING DEVICE 102
(E.G., DATA COLLECTION
SERVICE)

←—————SEND PARTICIPATION REQUEST 202—————

—————SEND IMAGE DATA 204—————→

—————SEND LOCATION DATA 206—————→

—————SEND USER-INPUT DATA 208—————→

PERFORM LOCATION
VALIDATION
210

PERFORM IMAGE
RECOGNITION
212

PERFORM MAKE/MODEL
LOOKUP
214

GENERATE PROFILE
216

←—————FULFILL INCENTIVE 218—————

RECEIVE, FROM COMPUTING DEVICE, LOCATION INFORMATION
402

RECEIVE, FROM COMPUTING DEVICE, IMAGE DATA
404

DETERMINE IDENTIFYING INFORMATION OF AT LEAST ONE EQUIPMENT DEPICTED IN THE IMAGE DATA
406

CREATE A PROFILE FOR A SITE OF A USER ASSOCIATED WITH THE COMPUTING DEVICE BASED ON LOCATION INFORMATION AND/OR IDENTIFYING INFORMATION
408

STORE THE PROFILE
410

RECEIVE A REQUEST TO PARTICIPATE IN A DATA COLLECTION SURVEY
502

DETERMINE LOCATION INFORMATION ASSOCIATED WITH MOBILE
COMPUTING DEVICE
504

CAPTURE IMAGE DATA
506

SEND AT LEAST ONE OF LOCATION INFORMATION OR IMAGE DATA TO A
COMPUTING DEVICE
508

RECEIVE AN INCENTIVE IN RESPONSE TO SENDING AT LEAST ONE OF THE
LOCATION INFORMATION OR THE IMAGE DATA TO THE COMPUTING
DEVICE
510

ENERGY EFFICIENCY DATA COLLECTION SERVICE

CROSS REFERENCE TO RELATED APPLICATIONS

This patent application is a continuation of U.S. patent application Ser. No. 16/457,059, filed Jun. 28, 2019, titled: ENERGY EFFICIENCY DATA COLLECTION SERVICE," which claims priority filing benefit from U.S. Provisional Patent Application No. 62/826,031, filed Mar. 29, 2019, both of which are hereby incorporated by reference, in their entirety.

BACKGROUND

Utility companies and other entities participating in a utility communication network strive to increase the energy efficiency associated with providing and consuming utility services at a local level. Spatially and temporally granular energy efficiency data that is associated with individual residences or buildings is required to generate analytics used to improve energy efficiency. Unfortunately, existing solutions have not enabled accurate or efficient collection of this data.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Overview of System Architecture

Figure 1:
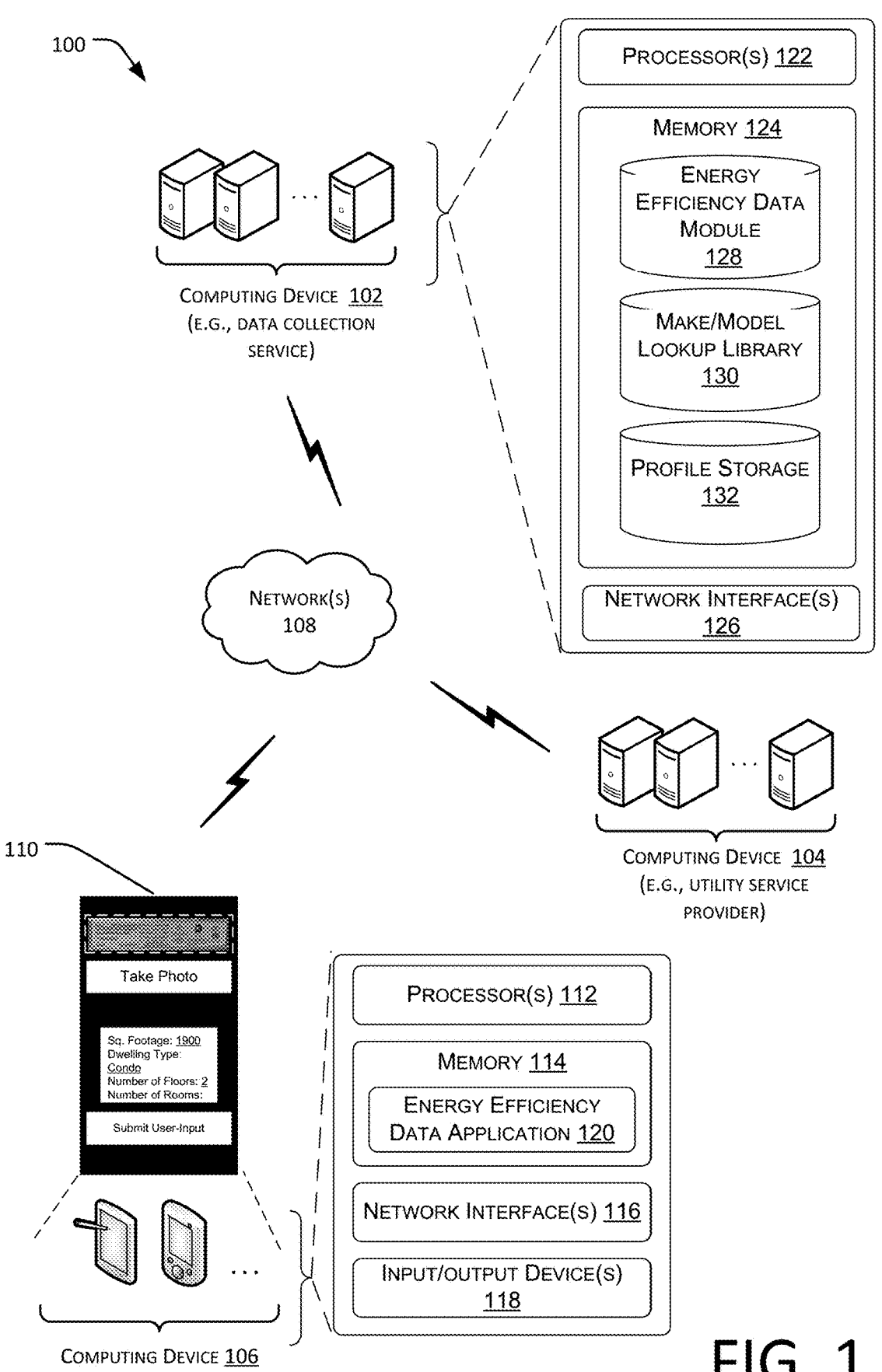
FIG. 1 is a schematic diagram of an example architecture usable to facilitate collection of energy efficiency data associated with a site of a user.

Existing systems make it difficult for utility companies and other entities participating in a utility communication network to obtain granular data detailing how energy is consumed at individual consumers residences or buildings. For example, a utility company (or another interested entity) may wish to know what types of equipment (e.g., HVAC, water heater, dishwasher, washing machine, dryer, etc.) are installed at a site associated with a user, the location of the site associated with the user, and/or information about a residence or building located at the site associated with a user (e.g., square footage, a dwelling type, number of floors, number of rooms, types of rooms, number of occupants, age of occupants, number of windows, type of roof, types of distributed generation sources (e.g., solar panels, wind, geothermal, generator, etc.), types of distributed storage (e.g., battery storage, electric vehicle), etc.). This information, if available, could be used by the utility company to perform a wide range of analytics making it possible to take actions to improve energy efficiency. Example actions include identifying customers for participating in energy efficiency programs, forecasting a future consumption of a site of a user, forecasting a future consumption of an equipment, forecasting a future consumption of an area including the site of a user (e.g., forecasting demand for a neighborhood that includes the site that provided the data), evaluating a site of a user for inclusion in a demand response program, performing demand response programs, distribution-level load forecasting for improved distribution capacity planning, benchmarking customer-specific equipment performance against minimum code, equipment-specific energy/water savings recommendations, and so forth. Current systems for obtaining this information are limited to on-sites surveys with a trained energy engineer that manually records information or telephone and web surveys in which customers are asked to self-report information regarding residences/buildings and equipment located on site. On-site surveys are often expensive and therefore can typically only be used to generate statistically representative estimates of building and equipment characteristics at high levels of geospatial aggregation (e.g. for a utility service territory as a whole). Telephone and web surveys are subject to high levels of self-report bias and inaccuracy. Therefore, neither of the current systems for obtaining equipment data or building data are capable of accurately capturing the spatial and temporal granular data necessary to improve energy efficiencies over a large scale.

This application describes techniques for an energy efficiency data collection service to enable utility companies and other entities participating in a utility communication network to obtain granular data detailing how energy is consumed at individual consumer residences, offices, or other buildings (referred to herein collectively as "sites"). In some examples, the energy efficiency data collection service may be implemented by a manufacturer, vendor, supplier, or other third-party that provides, services, or administers at least a portion of a distribution network and/or a communication network. In some examples, the data collection service may be implemented by a utility supplier entity that provides a physical resource such as electricity, water, or gas to one more sites via a physical distribution network (e.g., the wires and pipes through which the resource passes to reach the sites).

In some examples, a computing device associated with the data collection service may send a request to a mobile device associated with a user requesting that the user participate in an energy efficiency data collection survey. In some examples, the request may specify an application which the user may download and/or install onto the mobile device in order to participate in the data collection survey. Once installed, the application may be used to obtain energy efficiency data associated with the user and/or a building associated with the user. For example, the application may ask the user for user-input regarding details of the building associated with the user, energy consumption habits of the user, water consumption habits of the user, and so on. In some examples, the application may enable the user to take a picture of equipment (e.g., HVAC, water heater, dishwasher, washing machine, dryer, etc.) located at the site associated with the user. In some examples, the application may obtain location data via a location tracking device located within the mobile phone. Once the energy efficiency data (e.g., user-input data, image data, and location data) is obtained, the application may send the energy efficiency data to the computing device associated with the data collection service. In some examples, sending the energy efficiency data to the computing device associated with the data collection service may result in the user associated with mobile device receiving an incentive.

In some examples, the computing device associated with the data collection service may receive the energy efficiency data from mobile device associated with user and store the information in a database. In some examples, the computing device associated with the data collection service may perform image recognition on the image data to determine a make and/or model of the equipment located in the image data. This may be done by isolating a make and/or model number found on a nameplate of the equipment located in the image data. Once the make and/or model number is determined, the computing device may utilize a lookup algorithm to identify equipment-specific and/or model specific characteristics using an equipment characteristic database. Once the user-input data is received, the equipment-specific and/or model specific characteristics are determined, and the location data is received, the computing device may generate a profile containing the energy efficiency data and associate the profile with the user and/or the building associated with the user. In some examples, an existing profile that is already associated with the user and/or building may be updated with the new energy efficiency data. Once the profile is generated and/or updated, the computing device associated with the data collection service may pay an incentive/reward to the user for participating in the data collection survey. In some examples, the computing device associated with the data collection service may send a message to a computing device associated with a utility service provider indicating that the user has participated in the data collection survey and the utility service provider may provide the incentive/reward to the user.

In some examples, the profiles generated by the data collection service may be used in analytics to increase energy efficiency. For example, the profiles may be used to target specific customers for participation in energy efficiency and/or demand response programs. In some cases, data on customer-specific equipment capacities and efficiencies allows utility service providers to reliably identify the specific customers that present the most cost-effective and/or valuable energy efficiency or demand response opportunities and target those customers with customized outreach and offers. Current analytics-driven methods to target the "best" customers for energy efficiency and demand response programs rely on whole-home interval meter data (along with weather and demographic data) but cannot be used to reliably estimate the availability of cost-effective energy savings for demand flexibility at specific premises.

In some examples, the profiles generated may be used to determine distribution-level load forecasting for improved distribution capacity planning. For example, the data needed to support distribution-level load forecasting (e.g. for specific distribution nodes such as substations, feeders, or distribution transformers) do not exist. Distribution-level load forecasting would enable utility suppliers to better optimize distribution capacity infrastructure.

In some examples, the profiles generated may be used for benchmarking customer-specific equipment performance against minimum code, Energy Star, best-in-class, etc. (based on rated values). For example, the current practice is to compare a user's total consumption against total consumption in homes of similar size, age, and location to produce benchmarks of "efficient" vs. "inefficient" homes. Collecting the energy efficiency data and generating profiles allows for meaningful equipment-level benchmarking for specific users at a scale not previously possible.

In some examples, the profiles generated may be used for equipment-specific energy/water savings recommendations and cost-effectiveness metrics. For example, current analytics-driven methods to generate energy/water savings recommendations rely on whole-home interval meter data (along with weather and demographic data) and are thus subject to significant levels of "false positives" (e.g. making recommendations for water heater upgrades at home with efficient water heaters already installed) which can result in a lack of consumer trust and/or action Collecting the energy efficiency data and generating profiles allows equipment-savings interventions to be recommendations with a higher level of accuracy and much lower level of false positives.

Example System

FIG. 1 is a diagram illustrating an example networked environment or architecture 100 including a computing device 102, a computing device 104, and a computing device 106, which may be configured to communicate with one another via one or more networks 108 to collect energy efficiency data and to generate profiles.

The computing device 106 may display an interface 110 which may be used to collect energy efficiency data associated with a user of the computing device 106. The computing device 106 may be equipped with one or more processors 112, memory 114, one or more network interfaces 116, and one or more input/output devices 118. The one or more network interfaces 116 may enable the computing device 106 to communicate over the one or more networks 108 and/or other networks. The one or more input/output devices 118 may include a camera, mouse, a touch screen, a keyboard, a monitor, a stylus, a sensor, a speaker, and/or another device capable of receiving input or outputting information.

The memory 114 may include one or more devices containing processor-readable instructions, which when executed by the one or more processors 112 perform functions that may include some or all of the techniques and/or functionality described herein. In a further example, the functionality of the one or more processors 112 and processor-executable instructions defined in the memory 114 may be performed by a hardware device, such as an application specific integrated circuit (ASIC), a gate array or other hardware-based logic device.

In the example computing device 106, the memory 114 may include an energy efficiency data application 120 configured to perform various functionality associated with the interface 110. For example, the energy efficiency data application 120 may generate information for displaying the interface 110 and/or provide that information to be output on a screen associated with the computing device 106. In some instances, the energy efficiency data application 120 obtains information from the computing device 102 and/or the computing device 104, such as requests and incentives described herein. The energy efficiency data application 120 may also receive input (e.g., for selection of displayed information) through the one or more input/output devices 118 and/or perform operations based on the input.

The computing device 102 may be associated with a data collection service and may be equipped with one or more processors 122, memory 124, and/or one or more network interfaces 126. The one or more network interfaces 126 may enable the computing device 102 to communicate over the one or more networks 108 and/or other networks. In some instances, the computing device 102 is configured as a resource in a cloud computing environment or data center. Further, in some instances the computing device 102 may be associated with a utility service provider.

The memory 124 may include a data store for an energy efficiency data module 128, a make/model lookup library 130, and a profile storage 132. The energy efficiency data module 128 may be maintained at the computing device 102 and may be configured to communicate with the energy efficiency data application 120 of the computing device 106. For example, the energy efficiency data module 128 may be configured to receive energy efficiency data captured by the energy efficiency data application 120 and may utilize the energy efficiency data to generate a profile for a user and/or a building associated with a user that is associated with the computing device 106.

The make/model lookup library 130 may be utilized by the energy efficiency data module 128 to determine model-specific characteristics of equipment based on image data (e.g., images of nameplates of the equipment) of equipment received by the energy efficiency data module 128 from the energy efficiency data application 120. The make/model lookup library 130 may contain a variety of equipment-specific and/or model-specific characteristics for equipment or models of equipment, such as, but not limited to, rated annual energy consumption (e.g., kWh/yr, BTU/yr, etc.), rated annual water consumption (e.g., gallons/yr), rated efficiency (e.g., SEER, CEER, EER, HSPF, EF, MEF, CEF, UEF, AFUE, etc.), rated capacity (e.g., heating/cooling output in BTUH, volume in cubic feet or gallons), vintage, Energy Star qualification, and Energy Star Most Efficiency criteria qualification. The information stored in the make/model lookup library 130 may be obtained from publicly and commercially available data from the U. S. Department of Energy, the California Energy Commission, the U.S. Environmental Protection Agency, the Consortium for Energy Efficiency, archival data from the Federal Trade Commission, and manufacturer product specification documentation.

The profile storage 132 may be utilized to store profiles associated with a number of different users who participate in the energy efficiency data collection survey and who provide energy efficiency data to the energy efficiency data module 128.

Referring to FIG. 1, a user associated with the computing device 106 may receive a request from the computing device 102 requesting that the user participate in an energy efficiency data collection survey. In some examples, the request may specify the energy efficiency data application 120 to download onto the mobile device in order to participate in the data collection survey. In some examples, a user or a group of users may be targeted by the computing device 102 and/or the computing device 104 to receive the request to participate in the energy efficiency data collection survey. For example, a utility service provider that supplies a resource to a particular area may be concerned about the effectiveness of the distribution system given current demand (e.g., too much delivery capacity, lack of delivery capacity, etc.) and/or about how the current or planned distribution system will be able to handle future demand changes in the particular area. The computing device 102 and/or the computing device 104 may identify such an area and, based on the identification, all or some (e.g., a sampling) of the users (e.g., utility consumers) in the particular area may be selected to participate in the energy efficiency data collection survey and/or an incentive program for performing the energy efficiency data collection survey according to the systems and methods described herein. In some cases, the computing device 104 may be associated with a utility service provider and may provide contact information of the targeted users to the computing device 102, which may be associated with a third-party administering the energy efficiency data survey on its behalf. In some cases, the computing device 104 may use the contact information to administer the energy efficiency data survey and profile generation itself as described herein. Once downloaded, the energy efficiency data application 120 may be used to obtain energy efficiency data associated with the user and/or a building associated with the user. For example, the energy efficiency data application 120 may ask the user for user-input regarding details of the building associated with the user, energy consumption habits of the user, water consumption habits of the user, and so on. In some examples, the energy efficiency data application 120 may enable the user to take a picture of equipment (e.g., HVAC, water heater, dishwasher, washing machine, dryer, etc.) located at the site associated with the user. In some cases, the energy efficiency data application 120 may prompt users with suggestions of the equipment to capture images of. In some examples, the energy efficiency data application 120 may associate meta data, such as an identifier of the suggested appliance, with the image data captured in response to the suggestion. This meta data may be sent with the image data to the computing device 102. In some examples, in response to a prompt to capture an image of a particular equipment, the energy efficiency data application 120 may record a user input indicating that there is no corresponding equipment at the premise. The energy efficiency data application 120 may collect other types of user-input data, such as, but not limited to, square footage, a dwelling type, number of floors, number of rooms, types of rooms, number of occupants, age of occupants, number of windows, type of roof, types of distributed generation sources (e.g., solar panels, wind, geothermal, generator, etc.), types of distributed storage (e.g., battery storage, electric vehicle), etc.), energy consumption habits of the user, water consumption habits of the user, behavioral data (e.g., seasonal occupancy of the dwelling), and so on. This user-input data may be sent to the computing device 102. In some examples, the energy efficiency data application 120 may obtain location data via a location tracking device located within the mobile phone. Once the energy efficiency data (e.g., user-input data, image data, meta data, and location data) is obtained, the energy efficiency data application 120 may send the energy efficiency data to the computing device 102. In some examples, sending the energy efficiency data to the computing device 102 may result in the user associated with computing device 106 receiving an incentive. In some examples, the energy efficiency data that is sent to the computing device 102 may include other types of data that do not include user-input data, image data, and location data. In some cases, only a portion of the energy efficiency data survey may be completed, and a profile may be generated and utilized as described herein. In some examples, the energy efficiency data application 120 may request energy efficiency data from the user in order of how valuable the data may be. For example, a utility service provider may determine that HVAC system data may be a higher priority data than exterior lighting data and the energy efficiency data application 120 may question the user regarding HVAC system data before questioning the user regarding exterior lighting data. In this way, the energy efficiency data application 120 may maximize the value of partially completed energy efficiency data surveys.

In some examples, the computing device 102 may receive the energy efficiency data from computing device 106 associated with user and store the information in the energy efficiency data module 128. In some examples, the computing device 102 may perform image recognition on the image data to determine a make and/or model of the equipment located in the image data. This may be done by isolating a make and/or model number found on a nameplate of the equipment located in the image data. In some examples, a user may manually identify the make and/or model number found in the image data and enter the information into the energy efficiency data module 128. In some examples, the image recognition may be performed via an optical character recognition (OCR) component stored in the computing device 102. In some examples, the image recognition may be performed via a machine learning algorithm component stored in the computing device 102. In some examples, the machine learning algorithm may include multiple models that may be updated based on historical data. The machine learning algorithm may include heuristics, IF-THEN statements, and the like. In some examples, a machine learning algorithm can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like. In some examples, a combination of manual identification via a user, OCR, and/or a machine learning algorithm may be used for image recognition. Once the make and/or model number is determined, the computing device may utilize a lookup algorithm to identify equipment-specific and/or model specific characteristics using the make/model lookup library. In some cases, image recognition may be performed if the nameplate is not included in the image data. For example, the image data may include the equipment itself and the computing device 102 may determine a make/model of the equipment based on a logo/name located on the equipment, a shape of the equipment, a size of the equipment, etc. Once the user-input data is received, the equipment-specific and/or model specific characteristics are determined, the meta data is received, and the location data is received, the computing device 102 may generate a profile containing the energy efficiency data and associate the profile with the user and/or the building associated with the user and store the profile in the profile storage 132. In some examples, an existing profile that is already associated with the user and/or building may be updated with the new energy efficiency data. Once the profile is generated and/or updated and stored, the computing device 102 may pay an incentive/reward to the user for participating in the data collection survey. In some examples, the computing device 102 may send a message to a computing device 104 that may be associated with a utility service provider indicating that the user has participated in the data collection survey and the utility service provider may provide the incentive/reward to the user. In some examples, the profiles and/or a portion of a profile may be provided to the computing device 104, which may be associated with a utility service provider, and be used for distribution system evaluation/planning in a particular area or for other purposes as described herein. In some examples, the profiles and/or a portion of a profile may be provided to the user that participated in the energy efficiency data collection survey.

In some examples, the computing device 102 may provide the profiles that contain the energy efficiency data to the computing device 104, which may be associated with a utility suppler. The computing device 104 may utilize the profiles for analytics to increase energy efficiency. For example, the computing device 102 and/or the computing device 104 may target specific customers, based on the profiles, for participation in energy efficiency and/or demand response programs. In some cases, this may include controlling equipment located at the site of the user (e.g., adjusting a setting, adjusting temperature adjusting intensity, adjusting rate, adjusting cycle, etc.). In some cases, this may include connecting or disconnecting a resource (e.g., electricity, water, gas, etc.) at the site of the user. In some cases, this may include forecasting a future consumption of the site of the user. In some cases, this may include evaluating the site of the user for inclusion in a demand response program. In some cases, data on customer-specific equipment capacities and efficiencies allows utility service providers to reliably identify the specific customers that present the most cost-effective and/or valuable energy efficiency or demand response opportunities and target those customers with customized outreach and offers.

In some examples, the computing device 104 may determine distribution-level load forecasting for improved distribution capacity planning based on the profiles.

In some examples, the computing device 104 may determine, based on the profiles, benchmarking customer-specific equipment performance against minimum code, Energy Star, best-in-class, etc. (based on rated values).

In some examples, the computing device 104 may determine equipment-specific energy, gas, and/or water savings recommendations and cost-effectiveness metrics based on the profiles.

In some examples, the profiles, or any other information collected by the computing device 102, may be used for automated evaluation, measurement, and verification (EM&V) for users participating in energy efficiency activities. For example, EM&V may include assessing the performance of energy efficiency activities (e.g., lighting retrofits, appliance upgrades, heating/cooling system upgrades, etc.) and determine if the energy efficiency activities are generating the expected level of savings. Automation of EM&V may be performed by either or both of the computing device 102 or the computing device 104 and requires massive amounts of data that may be provided by the profiles generated by the computing device 102. For example, an automated EM&V program may store the information included in the profiles as well as information that identifies which energy efficiency activities the users associated with the profiles are participating in. In some examples, the computing device 102 may send push notifications to the computing device 106, via the energy efficiency data application 120, that includes questions based on which energy efficiency activity the automated EM&V program is analyzing. For example, the computing device 102 may send a push notification to the computing device 106, via the energy efficiency data application 120, that includes questions regarding an HVAC system or water heating system located at the user's household to obtain data on non-routine events that an automated EM&V program must control for (e.g., were any new equipment installed recently?

Did the occupancy of the premise change recently? Did any equipment fail or malfunction recently?). By sending push notifications to users via the energy efficiency data application 120, the computing device 102 and/or the computing device 104 can obtain the non-routine event data required to accurately and efficiently operate an automated EM&V program The memory 114 and/or 124 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves. That is, the computer-readable media includes non-transitory computer-readable media.

The computing device 102, the computing device 104, and/or the computing device 106 may be implemented as one or more computing devices or mobile computing devices, such as a server(s), a personal computer(s), a laptop computer(s), a smart phone(s), an electronic reader device (s), a mobile handset(s), a personal digital assistant(s) (PDA), a portable navigation device(s), a portable gaming device(s), a tablet computer(s), a watch(s), a portable media player(s), another client device(s), and the like.

As noted above, the computing device 102, the computing device 104, and/or the computing device 106 may communicate via the one or more networks 108. The one or more networks 108 may include any one or combination of multiple different types of networks, such as cellular networks, wireless networks, Local Area Networks (LANs), Wide Area Networks (WANs), and the Internet.

Illustrative Flow of Operations

Figure 2:
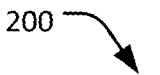
FIG. 2 is flow diagram of an example method for collecting energy efficiency data and generating a profile associated with a site of a user.

FIG. 2 illustrates an example flow of operations 200 that may be used for collecting energy efficiency data and generating a profile for a user associated with the energy efficiency data. The example flow of operations 200 is described in the context of the example of architecture 100 and with reference to the devices illustrated in FIG. 1. However, the flow of operations 200 is not limited to use with the architecture 100 and devices of FIG. 1 and may be implemented using other architectures and devices.

The flow of operations 200 may include at block 202 with the computing device 102 sending a participation request to the computing device 106. In some examples, the request may indicate that an incentive may be provided to a user associated with the computing device 106 in response to the user participation in an energy efficiency data collection survey. In some examples, the request may specify an application, such as energy efficiency data application 120, in which the user may download onto the computing device 106 in order to participate in the energy efficiency data collection survey. In some examples, a user may download the energy efficiency data application 120 without receiving a participation request. In this case, the user may download the energy efficiency data application 120 from an application store.

At block 204, once the energy efficiency data application 120 is downloaded, the user may capture image data and send the image data to the computing device 102. For example, the energy efficiency data application 120 may enable the user to take a picture of equipment (e.g., HVAC, water heater, dishwasher, washing machine, dryer, etc.) located at the site associated with the user. The energy efficiency data application 120 may prompt the user to take a picture of a nameplate attached to an equipment that includes a make or model number of the equipment.

At block 206, the energy efficiency data application 120 may obtain location data via a location tracking device located within the mobile phone and may send the location data to the computing device 102.

At block 208, energy efficiency data application 120 may receive user-input data from the user associated with the computing device 106 and may send the user-input data to the computing device 102. For example, the energy efficiency data application 120 may ask the user for user-input regarding details of the building associated with the user (e.g., square footage, a dwelling type, number of floors, number of rooms, types of rooms, number of occupants, age of occupants, number of windows, type of roof, types of distributed generation sources (e.g., solar panels, wind, geothermal, generator, etc.), types of distributed storage (e.g., battery storage, electric vehicle), etc.), energy consumption habits of the user, water consumption habits of the user, and so on. The energy efficiency data (e.g., the image data, the location data, meta data, and the user-input data) may be sent to the energy efficiency data module 128 of the computing device 102.

At block 210, the computing device 102 may perform location validation based on the location data received from the energy efficiency data application 120. For example, the computing device 102 may receive service address information from a utility service provider (e.g., computing device 104) and compare the location data to the service address information. In some cases, the computing device 102 may compare the location data to location data that was previously received by the user associated with the computing device 106. In some examples, the computing device 102 may correlate the location data to a pre-existing utility account. For instance, the location data may be correlated with an address/building associated with a site that receives utility services.

At block 212, the computing device 102 may perform image recognition on the image data received from the energy efficiency data application 120. For example, the image data may contain an image of a nameplate of an equipment. The computing device 102 may isolate a make and/or model number found on the nameplate of the equipment located in the image data.

At block 214, the computing device 102 may perform a make/model lookup in order to determine equipment-specific and/or model-specific characteristics of the equipment found in the image data. For example, the computing device 102 may utilize a lookup algorithm to identify equipment-specific and/or model-specific characteristics using a characteristic database, such as the make/model lookup library 130 of the computing device 102. The make/model lookup library 130 may contain a variety of equipment-specific and/or model-specific characteristics for equipment or models of equipment, such as, but not limited to, rated annual energy consumption (e.g., kWh/yr, BTU/yr, etc.), rated annual water consumption (e.g., gallons/yr), rated efficiency (e.g., SEER, CEER, EER, HSPF, EF, MEF, CEF, UEF, AFUE, etc.), rated capacity (e.g., heating/cooling output in BTUH, volume in cubic feet or gallons), vintage, Energy Star qualification, and Energy Star Most Efficiency criteria qualification.

At block 216, the computing device 102 may generate a profile containing the energy efficiency data and associate the profile with the user and/or the building associated with the user. In some examples, the profile may be stored in the profile storage 132 of the computing device 102. In some examples, an existing profile that is already associated with the user and/or building may be updated with the new energy efficiency data.

At block 218, the computing device 102 may fulfill an incentive to the user of the computing device 106 in response to the user agreeing to participate in the energy efficiency data collection survey and in response to sending the energy efficiency data. The incentive may include a rebate, gift card, cash value, etc.

Example User Interfaces

Figures 3A, 3B, 3C:
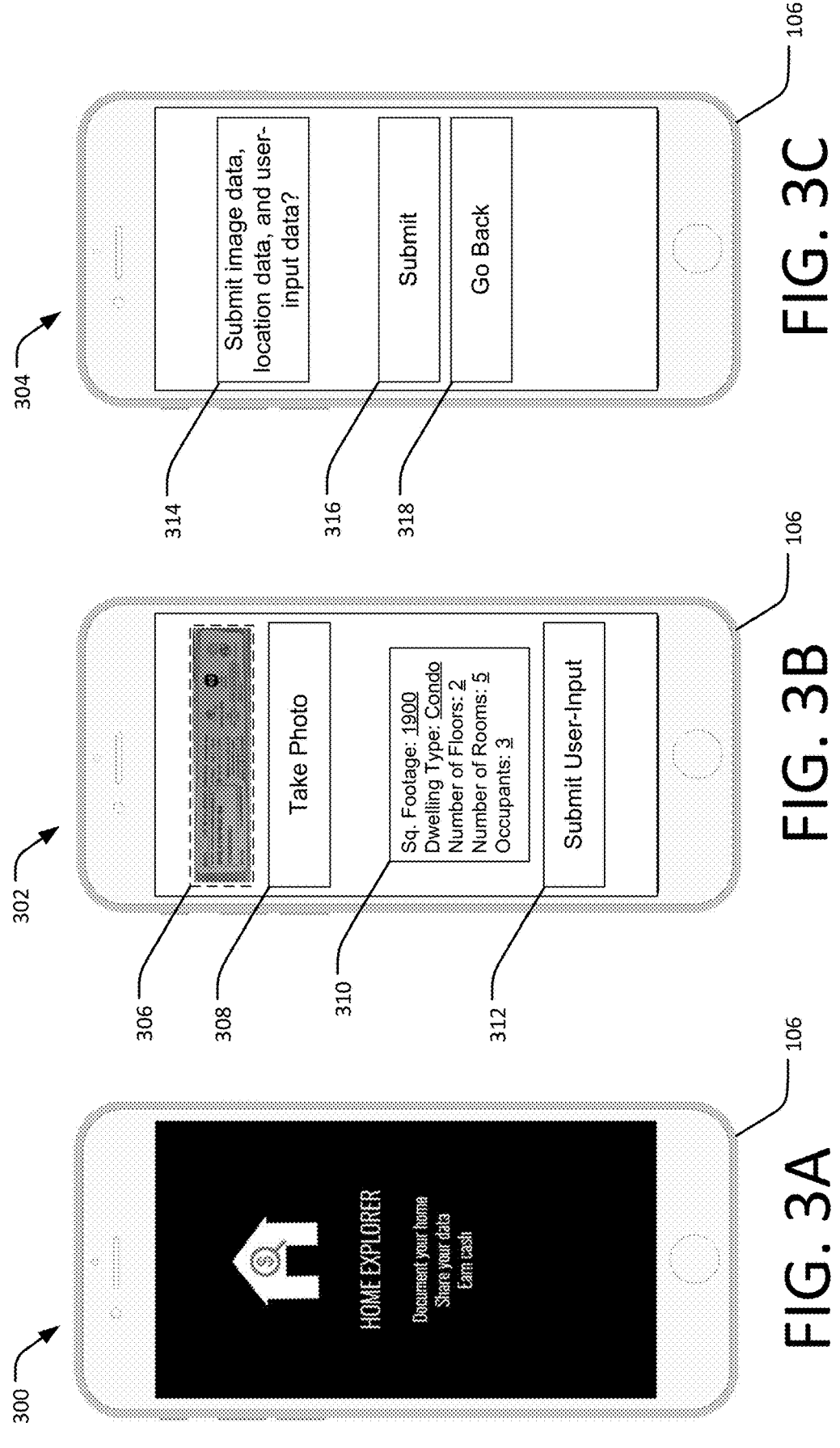
FIG. 3A is a schematic diagram of an example graphical user interface usable by one or more users to input and collect energy efficiency data.
FIG. 3B is a schematic diagram of an example graphical user interface usable by one or more users to input and collect energy efficiency data.
FIG. 3C is a schematic diagram of an example graphical user interface usable by one or more users to input and collect energy efficiency data.

FIGS. 3A-3C illustrate example user interfaces 300, 302, and 304 that may be presented to a user via the computing device 106 to allow the user to participate in the energy efficiency data collection survey. In some examples, the interfaces 300, 202, and 304 are associated with the energy efficiency data application 120.

FIG. 3A illustrates the example user interface 300 which may include an introductory page to the energy efficiency data application 120 while the energy efficiency data application 120 is loading. It is to be understood that the text and images of the user interface 300 (as well as user interfaces 302 and 304) are examples of text and images only and that any text or image that may assist in the collection of energy efficiency data may be used in the energy efficiency data application 120.

FIG. 3B illustrates the example user interface 302 which may include a viewing pane 306 and a button 308 for capturing image data using a camera of the computing device 106. Additionally, user interface 302 illustrates a user-input field 310 and a button 312 for submitting the information included in the user-input filed 310. Although a nameplate is included in the viewing pane 306 of the user interface 302, it is to be understood that the viewing pane 306 may include an image of any part of the equipment or the entire equipment itself.

FIG. 3C illustrates the example user interface 304 which may include a confirmation 314 that the user would like to submit the image data, the location data, and the user-input data to the energy efficiency data collection service. The user interface 304 may include an option to submit 316 or an option to go back 318 allowing the user to revise any information shown on a previous interface.

Example Method of Action Performed by Computing Device

Figure 4:
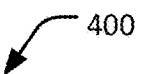
FIG. 4 is a flowchart of an example method that may be implemented by a computing device to receive energy efficiency data and generate a profile.
Figure 4:
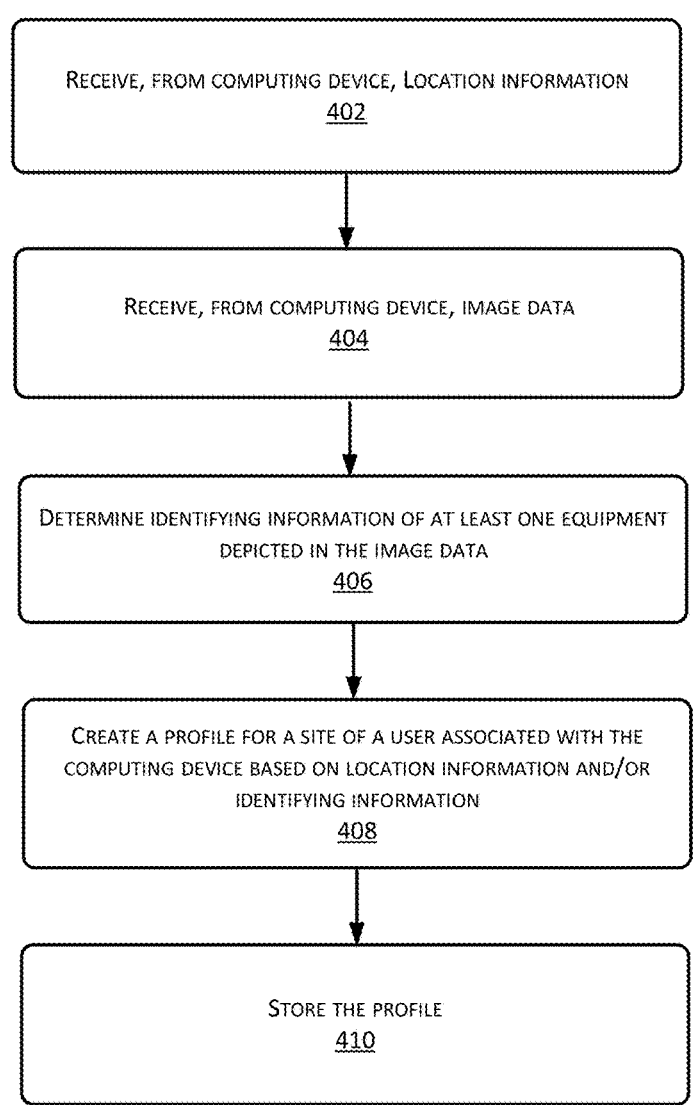

FIG. 4 is a flowchart which illustrates an example flow of operations 400 that may be performed by a computing device to collect energy efficiency data and to generate a profile. The example flow of operations 400 is described in the context of the example of architecture 100 and with reference to the devices illustrated in FIG. 1. However, the flow of operations 400 is not limited to use with the architecture 100 and devices of FIG. 1 and may be implemented using other architectures and devices.

The flow of operations 400 may include, at block 402, with a computing device receiving, from another computing device, location information. In some examples, the computing device 102 may be associated with an energy efficiency data collection service and may be configured to receive location data from a computing device 106 that is participating in the energy efficiency data collection survey. The location data may indicate a location of a residence and/or building associated with a user of the computing device 106.

At block 404, the computing device may receive, from the other computing device, image data. In some examples, the computing device 102 may be configured to receive image data from the computing device 106 that is participating in the energy efficiency data collection survey. The image data may include a picture of equipment (e.g., HVAC, water heater, dishwasher, washing machine, dryer, etc.) located at a site associated with the user and/or a nameplate attached to the equipment that includes a make or model number of the equipment.

At block 406, the computing device may determine at least one identifying information of at least one equipment depicted in the image data. In some examples, the computing device 102 may perform image recognition on the image data received from the energy efficiency data application 120. For example, the image data may contain an image of a nameplate of an equipment. The computing device 102 may isolate a make and/or model number found on the nameplate of the equipment located in the image data. In some examples, the computing device 102 may perform a make/model lookup in order to determine equipment-specific and/or model-specific characteristics of the equipment found in the image data. For example, the computing device 102 may utilize a lookup algorithm to identify equipment-specific and/or model-specific characteristics using a characteristic database, such as the make/model lookup library 130 of the computing device 102. The make/model lookup library 130 may contain a variety of equipment-specific and/or model-specific characteristics for equipment or models of equipment, such as, but not limited to, rated annual energy consumption (e.g., kWh/yr, BTU/yr, etc.), rated annual water consumption (e.g., gallons/yr), rated efficiency (e.g., SEER, CEER, EER, HSPF, EF, MEF, CEF, UEF, AFUE, etc.), rated capacity (e.g., heating/cooling output in BTUH, volume in cubic feet or gallons), vintage, Energy Star qualification, and Energy Star Most Efficiency criteria qualification.

At block 408, the computing device may create a profile for a site of a user associated with the other computing device based on at least one of the location information or the identifying information. In some examples, the computing device 102 may generate a profile containing the energy efficiency data (e.g., location data, image data, user-input data, meta data, model-specific data, equipment specific data, etc.) and associate the profile with the user and/or the building associated with the user. In some examples, the profile may be stored in the profile storage 132 of the computing device 102. In some examples, an existing profile that is already associated with the user and/or building may be updated with the new energy efficiency data.

At block 410, the computing device may store the profile. In some examples, the profile may be stored in the profile storage 132 of the computing device 102. In some examples, an existing profile that is already associated with the user and/or building may be updated with the new energy efficiency data.

Example Method of Action Performed by Computing Device

Figure 5:
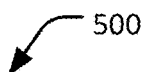
FIG. 5 is a flowchart of an example method that may be implemented by a mobile device to collect energy efficiency data.
Figure 5:
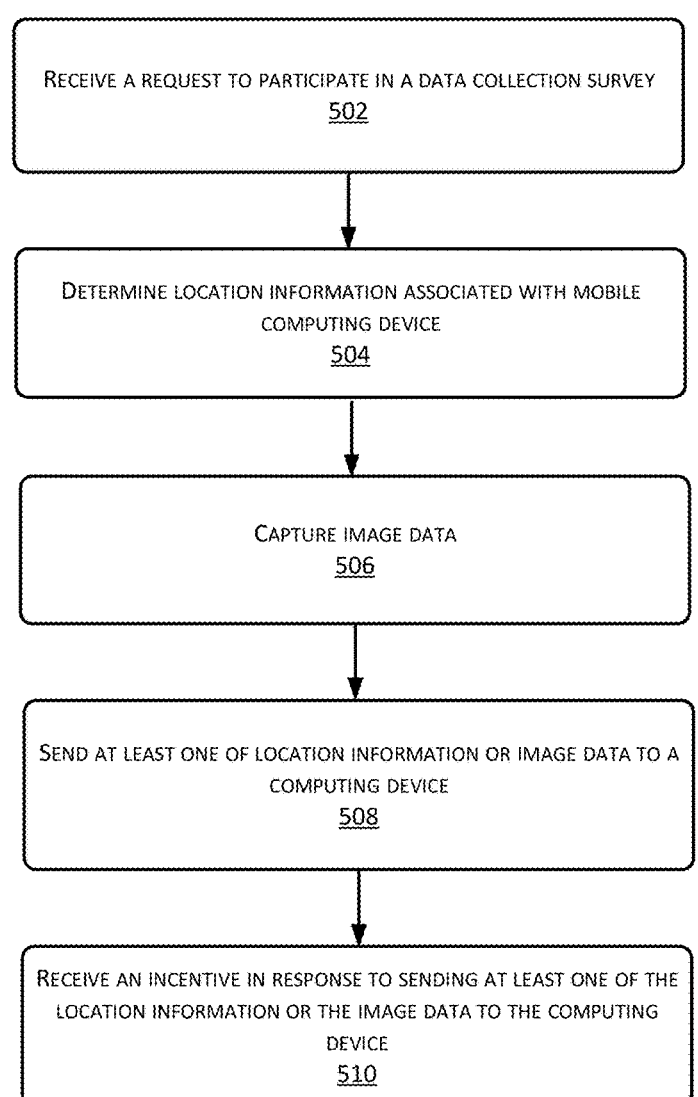

FIG. 5 is a flowchart which illustrates an example flow of operations 500 that may be performed by a computing device to collect energy efficiency data. The example flow of operations 500 is described in the context of the example of architecture 100 and with reference to the devices illustrated in FIG. 1. However, the flow of operations 500 is not limited to use with the architecture 100 and devices of FIG. 1 and may be implemented using other architectures and devices.

The flow of operations 500 may include, at block 502, with a computing device receiving a request to participate in a data collection survey. In some examples, the computing device 106 may receive a request from the computing device 102 to participate in an energy efficiency data collection survey. In some examples, the request may indicate that an incentive may be provided to a user associated with the computing device 106 in response to the user participation in an energy efficiency data collection survey. In some examples, the request may specify an application, such as energy efficiency data application 120, in which the user may download onto the computing device 106 in order to participate in the energy efficiency data collection survey.

At block 504, the computing device may determine location information associated with the mobile device. In some examples, the energy efficiency data application 120 of the computing device 106 may obtain location data via a location tracking device located within the mobile phone and may send the location data to the computing device 102.

At block 506, the computing device may capture image data. In some examples, the energy efficiency data application 120 of the computing device 106 may enable the user to take a picture of equipment (e.g., HVAC, water heater, dishwasher, washing machine, dryer, etc.) located at the site associated with the user. The energy efficiency data application 120 may prompt the user to take a picture of a nameplate attached to an equipment that includes a make or model number of the equipment.

At block 508, the computing device may send at least one of the location information or the image data to a computing device. In some examples, the energy efficiency data application 120 of the computing device 106 may send the determined location information and/or the captured image data to the computing device 102.

At block 510, the computing device may receive an incentive in response to sending at least one of the location information or the image data to the computing device. In some examples, the energy efficiency data application 120 of the computing device 106 may receive, from the computing device 102, an incentive to the user of the computing device 106 in response to the user agreeing to participate in the energy efficiency data collection survey and in response to sending the energy efficiency data. The incentive may include a rebate, gift card, cash value, etc.

The flows of operations illustrated in FIGS. 2, 4, and 5 are illustrated as collections of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, perform the recited operations. In the context of hardware, the blocks may represent one or more circuits (e.g., application specific integrated circuits—ASICs) configured to execute the recited operations.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed:

1. A method comprising:

receiving, by a mobile device, a request to participate in a data collection survey from a computing device, the request including an identification of an application installable on the mobile device and usable to participate in the data collection survey;

determining location information associated with the mobile device via a location tracking device located within the mobile device;

capturing image data of at least one equipment;

determining first priority data associated with a first type of efficiency data of a first type of system;

determining second priority data associated with a second type of efficiency data of a second type of system;

determining that the first type of efficiency data of the first type of system is of greater value than the second type of efficiency data of the second type of system based at least in part on the first type of system being a greater priority than the second type of system, wherein at least one of the first type of efficiency data or the second type of efficiency data comprises equipment-specific performance characteristics including at least one of rated annual energy consumption, rated annual water consumption, rated efficiency metrics, rated capacity measurements, or equipment vintage information;

determining that the first priority data is greater than the second priority data based at least in part on determining that the first type of efficiency data of the first type of system is of greater value than the second type of efficiency data of the second type of system;

determining an order in which to request the first type of efficiency data and the second type of efficiency data that results in an increase in efficiency of operation of the application by maximizing value of partially completed energy efficiency data surveys;

transmitting control signals to cause the mobile device to display a request for user input data associated with the first type of efficiency data based at least in part on determining that the first priority data is greater than the second priority data and the order;

receiving the user input data;

generating meta data including associating an identification of the at least one equipment with the image data;

transmitting the location information, the user input data, the meta data, and the image data to the computing device that sent the request to cause the computing device to generate or update a profile containing energy efficiency data and to cause the computing device to associate the profile with a user and a site;

receiving at least one of an equipment-specific energy or water savings recommendation from the computing device via the profile; and receiving an incentive from the computing device in response to transmitting the location information, the user input data, and the image data to the computing device.

2. The method of claim 1, wherein the image data comprises an image of at least one nameplate of the at least one equipment located at the site of the user associated with the mobile device.

3. The method of claim 1, wherein the image data includes identifying information comprising at least one of a make or model number of the at least one equipment located at the site of the user associated with the mobile device.

4. The method of claim 1, further comprising providing a recommendation to capture the image data, the recommendation including the identification of the at least one equipment.

5. The method of claim 1, further comprising receiving a request from the computing device for at least one of the location information or the image data.

6. The method of claim 5, wherein the request includes an offer identifying the incentive to be provided in response to sending the at least one of the location information or the image data.

7. The method of claim 1, further comprising receiving at least a portion of the profile for the site of the user associated with the mobile device based on at least the location information.

8. The method of claim 1, further comprising receiving user input indicating that the at least one equipment is not located at the site of the user associated with the mobile device.

9. A system comprising:

a processor; and memory storing executable instructions that, when executed by the processor, configure the system to perform acts comprising:

receiving, via a mobile device, a request to participate in a data collection survey from a computing device, the request including an identification of an application installable on the mobile device and usable to participate in the data collection survey;

determining location information associated with the mobile device via a location tracking device located within the mobile device;

capturing image data of at least one equipment;

determining first priority data associated with a first type of efficiency data of a first type of system;

determining second priority data associated with a second type of efficiency data of a second type of system;

determining that the first type of efficiency data of the first type of system is of greater value than the second type of efficiency data of the second type of system based at least in part on the first type of system being a greater priority than the second type of system, wherein at least one of the first type of efficiency data or the second type of efficiency data comprises equipment-specific performance characteristics including at least one of rated annual energy consumption, rated annual water consumption, rated efficiency metrics, rated capacity measurements, or equipment vintage information;

determining that the first priority data is greater than the second priority data based at least in part on determining that the first type of efficiency data of the first type of system is of greater value than the second type of efficiency data of the second type of system;

determining an order in which to request the first type of efficiency data and the second type of efficiency data that results in an increase in efficiency of operation of the application by maximizing value of partially completed energy efficiency data surveys;

transmitting control signals to cause the mobile device to display a request for user input data associated with the first type of efficiency data based at least in part on determining that the first priority data is greater than the second priority data and the order;

receiving the user input data;

generating meta data including associating an identification of the at least one equipment with the image data;

transmitting the location information, the user input data, the meta data, and the image data to the computing device that sent the request to cause the computing device to generate or update a profile containing energy efficiency data and to cause the computing device to associate a profile with a user and a site;

receiving at least one of an equipment-specific energy or water savings recommendation from the computing device via the profile; and receiving an incentive from the computing device in response to transmitting the location information, the user input data, and the image data to the computing device.

10. The system of claim 9, wherein the image data comprises an image of at least one nameplate of the at least one equipment located at the site of the user associated with the mobile device.

11. The system of claim 9, wherein the image data includes identifying information comprising at least one of a make or model number of the at least one equipment located at the site of the user associated with the mobile device.

12. The system of claim 9, the acts further comprising providing a recommendation to capture the image data, the recommendation including the identification of the at least one equipment.

13. A mobile device comprising:

a processor; and memory storing executable instructions that, when executed by the processor, configure the mobile device to perform acts comprising:

receiving a request to participate in a data collection survey from a computing device, the request including an identification of an application installable on the mobile device and usable to participate in the data collection survey;

determining location information associated with the mobile device via a location tracking device located within the mobile device;

capturing image data of at least one equipment;

determining first priority data associated with a first type of efficiency data of a first type of system;

determining second priority data associated with a second type of efficiency data of a second type of system;

determining that the first type of efficiency data of the first type of system is of greater value than the second type of efficiency data of the second type of system based at least in part on the first type of system being a greater priority than the second type of system, wherein at least one of the first type of efficiency data or the second type of efficiency data comprises equipment-specific performance characteristics including at least one of rated annual energy consumption, rated annual water consumption, rated efficiency metrics, rated capacity measurements, or equipment vintage information;

determining that the first priority data is greater than the second priority data based at least in part on determining that the first type of efficiency data of the first type of system is of greater value than the second type of efficiency data of the second type of system;

determining an order in which to request the first type of efficiency data and the second type of efficiency data that results in an increase in efficiency of operation of the application by maximizing value of partially completed energy efficiency data surveys;

transmitting control signals to cause the mobile device to display a request for user input data associated with the first type of efficiency data based at least in part on determining that the first priority data is greater than the second priority data and the order;

receiving the user input data;

generating meta data including associating an identification of the at least one equipment with the image data;

transmitting the location information, the user input data, the meta data, and the image data to the computing device that sent the request to cause the computing device to generate or update a profile containing energy efficiency data and to cause the computing device to associate a profile with a user and a site;

receiving at least one of an equipment-specific energy or water savings recommendation from the computing device via the profile; and

receiving an incentive from the computing device in response to transmitting the location information, the user input data, and the image data to the computing device.

14. The mobile device of claim 13, the acts further comprising providing a recommendation to capture the image data, the recommendation including the identification of the at least one equipment.

15. The mobile device of claim 14, the acts further comprising receiving user input indicating that the at least one equipment is not located at the site of the user associated with the mobile device.

16. The method of claim 1, further comprising receiving an offer to participate in a demand response program in response to sending the at least one of the location information, the user input data, or the image data to the computing device.

17. The method of claim 1, further comprising determining the location information, capturing the image data, and receiving the user input data via the application.

18. The method of claim 1, further comprising utilizing image recognition on the image data using a machine learning algorithm.

19. The method of claim 1, wherein determining that the first type of efficiency data of the first type of system is of greater value than the second type of efficiency data of the second type of system includes determining that the first type of system has a greater impact on energy consumption than the second type of system.

* * * * *